United States Patent [19]
Czarnecki et al.

[11] Patent Number: 5,502,528
[45] Date of Patent: Mar. 26, 1996

[54] MAGNETICS-ON-FILM IMAGE AREA RECORDING HEAD AND INTERFACE

[75] Inventors: Wlodzimierz S. Czarnecki, Santa Fe; George W. Brock, La Jolla; Kent R. Gandola, Carlsbad; Joseph de Lellis, Escondido; Christopher P. Mencher, Encinitas, all of Calif.

[73] Assignee: Eastman Kodak Company, Rochester, N.Y.

[21] Appl. No.: 333,532

[22] Filed: Nov. 2, 1994

[51] Int. Cl.⁶ ................................................ G03B 17/24
[52] U.S. Cl. .................................................. 354/106
[58] Field of Search ................................. 354/105, 106

[56] References Cited

U.S. PATENT DOCUMENTS

| | | | |
|---|---|---|---|
| 3,289,188 | 11/1966 | Pendleton | 340/174.1 |
| 3,370,157 | 2/1968 | Lockey | 235/61.11 |
| 3,391,399 | 7/1968 | Pendleton | 340/174.1 |
| 4,439,793 | 3/1984 | Nater . | |
| 4,669,016 | 5/1987 | Schmid et al. . | |
| 4,839,959 | 6/1989 | Mersing | 29/603 |
| 4,894,737 | 6/1990 | Hamana et al. | 360/130.21 |
| 4,910,629 | 3/1990 | Mitsuhashi et al. . | |
| 4,933,780 | 6/1990 | Wash et al. | 360/1 |
| 4,977,419 | 12/1990 | Wash et al. | 354/76 |
| 5,023,635 | 6/1991 | Nealon | 354/76 |
| 5,025,283 | 6/1991 | Robison | 355/40 |
| 5,049,914 | 9/1991 | Dassero | 354/288 |
| 5,097,278 | 3/1992 | Tamamura et al. | 354/105 |
| 5,146,378 | 9/1992 | Makino et al. . | |
| 5,173,828 | 12/1992 | Tanzer et al. | 360/130.21 |
| 5,276,472 | 1/1994 | Bell et al. | 354/76 |

*Primary Examiner*—Michael L. Gellner
*Assistant Examiner*—Christopher E. Mahoney
*Attorney, Agent, or Firm*—Peter J. Bilinski

[57] ABSTRACT

A photographic still camera for receiving an elongated filmstrip having a cross-curvature in the cross film direction across said filmstrip and having a substantially transparent magnetic layer deposited on the film surface and for recording or reproducing information on or from the magnetic layer in the image area in and relation to the exposure of image frames of the filmstrip. A magnetic head is formed of a plurality of frustums including inner frustums supporting a plurality of active head gaps in an interior region and at least one further outer frustum on each side of the inner frustums in the cross film direction. The frustums and active head gaps have a contoured height profile in the cross film direction positioned to penetrate the film plane and to wrap the filmstrip around the frustums in a cavity in the film transport path, the contoured height profile in the cross film direction ensuring elastic compliance of the active head gaps with the magnetic on film layer tracks, with or without applied film tension or film compression. Contouring is effected by lapping the head mounted in the film transport path to approximate the cross-curvature of the filmstrip.

32 Claims, 10 Drawing Sheets

| Head Material | Frustum | Penetration (mm) | Pitch (mm) | Grit, Lapping Distance |
|---|---|---|---|---|
| Mn-Zn Ferrite | 17 | 0.72 | 1 | 6u, 25ft<br>3u, 40ft |
| Al2O3 TiC | 17 | 0.73 | 1 | 6u, 60ft<br>3u, 30ft |
| Borosilicate Glass | 17 | 0.73 | 1 | 6u, 20ft<br>3u, 50ft |
| Mn-Zn Ferrite | 12 | 0.61 | 1.5 | 6u, 30ft<br>3u, 20ft |
| Borosilicate Glass | 12 | 0.62 | 1.5 | 6u, 10ft<br>3u, 50ft<br>1u, 20ft |
| Borosilicate Glass | 11 | 0.61 | 1.5 | 6u, 10ft<br>3u, 40ft |
| Borosilicate Glass | 10 | 0.56 | 2 | 1u, 100ft |

FIG. 10

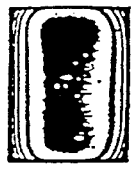
FIG. 12
FIG. 13

MAGNETICS-ON-FILM IMAGE AREA RECORDING HEAD AND INTERFACE

FIELD OF THE INVENTION

This invention relates to magnetic recording and reproducing heads, particularly for use for recording and reading information on a magnetics-on-film (MOF) layer in the image area of photographic filmstrips and particularly to the configuration and mounting of such heads to achieve high compliance with the relatively stiff filmstrip and MOF layer in cameras or other filmstrip handling apparatus.

BACKGROUND OF THE INVENTION

In commonly assigned U.S. Pat. Nos. 4,933,780 and 4,977,419, there is disclosed a photographic film having a virtually transparent magnetic layer covering the non-emulsion side of the film (referred to as an MOF layer) and dedicated recording areas or tracks on the layer for recording information such as film type, film speed, film exposure information and information relevant to the processing and subsequent use (e.g., printing) of the exposed image frames on dedicated longitudinally extending tracks. The systems disclosed therein provide for recording of information during film manufacture, reading and/or recording of information on certain tracks during camera use, and for reading and/or recording of print related information during photofinishing using the MOF layer. The information may include voiced messages or sound associated with the photographed scene and may be recorded in digital or analog format on certain of the tracks. The specific camera recording tracks and recording heads disclosed in the '419 and '780 patents are disposed to record in tracks located along the longitudinal edges of the film and outside the MOF tracks in the image frame. The possibility of recording audio within certain tracks of the MOF layer within the image frame area is described in commonly assigned U.S. Pat. No. 5,276,472.

Reading and recording information on tracks of a magnetic coating or stripes of magnetic coatings in the image frame area on photographic film in a still camera require solutions to problems different than those encountered in other apparatus. The space limitations in a portable handheld still camera, which necessarily must be as compact and light as possible to appeal to the average consumer, restrain the size and location of the magnetic record/reproduce head and the film drive system. In addition, the head-to-film recording and reading interface differs in major ways than that normally associated with digital magnetic tape drives or even disk drives, as described generally in the above-referenced '780 patent. In the image frame area, scratches of the emulsion layers or the MOF layer and film base must be avoided to maintain the quality of the image.

In a tape drive, the magnetic tape is flexible enough under tension to conform to the head contour both in the tape feed direction and in the cross-tape direction. In a disk drive, the head flies or floats on the air film that is created as the flat surface of the disk rotates at high speed.

Magnetic tape is quite thin and exhibits virtually no stiffness. Photographic film is of much greater thickness than the magnetic tape used for commercial and consumer recording and reproduction. When removed from its cartridge, a filmstrip shows a relatively high stiffness and very observable cross-curvature across its width that is convex on the non-emulsion side of the film. Further, the unwrapped filmstrip also shows a convex curvature along its length, again on the non-emulsion side of the film. This latter curvature is attributed primarily to a core-set curl that results from the filmstrip having been tightly wound on a film cartridge spool.

The cross-curvature across the width of the filmstrip is primarily caused by the number of multilayers of emulsion and the MOF layer (if present). The emulsion multilayers (and the MOF layer, if present) have different stretch properties than that of the base film substrate of acetate, PET, or PEN material. The cross-curvature is also influenced by the bending phenomena known as anticlastic curvature. The degree of filmstrip cross-curvature also depends on environmental conditions, including the time and temperature history of the film, the relative humidity, and the thickness of the film. Because of the cross-curvature, it is difficult to achieve good contact or compliance across the width of a wide, multi-track recording head. To provide a reliable read or write signal, the magnetic head must remain in close proximity to the magnetic coating. Any disturbances, such as variations in film curl, can vary the relationship of the head to the magnetic coating and, therefore decrease the reliability of the signal.

When a photographic filmstrip 20 is wrapped around a cylindrical contour surface 52, as is typically used in a magnetic tape head 50, most of the cross-curvature described above is reduced. As shown in FIG. 1, the filmstrip 20 would normally be tensioned in a film plane of a film transport path by tension applied in the direction of arrows 54, 56. The contour surface 52 of head 50 penetrates into the film plane, and the filmstrip 20 is warped over the contour surface 52 defining a gap line 60.

Despite this penetration of the film plane, intimate compliance or contact of the filmstrip 20 surface to the cylindrical surface 52 is not achieved. The variability of spacing in microinches across the film at the gap line 60 of contact between the filmstrip and the cylindrical surface 52 is measured and plotted in FIG. 2. In this example, the head 50 is a cylindrical surface of radius 13 mm (0.523") and is modeled from glass for demonstration purposes. The cylindrical surface at the gap line 60 is penetrated into the film plane of filmstrip 20 at a wrap angle (W.A.) of 1° and 3°, and a film tension of 55 grams is applied in each of the directions of the arrows 54, 56, FIG. 1.

A recording system specified for using the MOF layers requires that a spacing distance of 20 microinches or less along the gap line 60, that is, across the filmstrip MOF layer, be maintained to achieve specified record/reproduce performance. FIG. 2 shows that a spacing of greater than 20 microinches dominates over a vast portion of the interface at the apex of the compliance zone, with the exception of two narrow zones (zone 1 and zone 2). By changing the wrap angle to 3° or more, the compliance zones remain concentrated approximately 1 mm inward from the filmstrip edges. As in the previous case, the compliance zones are narrow. However, the separation between them widens. The largest distance along the gap line 60, however, continues to have a spacing unacceptably greater than 20 microinches.

As shown in FIG. 3, the spacing distance along the gap line 60 modulates from 0 to near 500 microinches for an interface without emulsion side support (load=0). As expected, a considerable reduction in the distance spacing along the gap line 60 is seen with progressively larger emulsion side forces. The emulsion side support, composed of a low coefficient of friction material such as a nonwoven polyester fiber material supported on a compliant backing such as a silicone rubber, is used to apply a distributed pressure force ranging from 0 to 50 grams against the emulsion side of the filmstrip immediately opposite to the cylindrical head surface and aligned with the gap line 60. However, even at the pressure loads of 50 grams, that part of the gap line 60 between 5 mm and 8.7 mm has larger than acceptable spacing. In spite of the spacing improvement demonstrated, the use of a pressure pad for image area support is not favored in that potential scratching of the emulsion layers may result which diminishes photographic image quality.

Another problem unique to recording and reproducing information on or from MOF layers in photographic still cameras is that film advancement occurs in a short period of time with a limited amount of motion. Stepper drive motors are commonly employed to move the filmstrip an image frame at a time and do not provide the steady state media advance conditions which are normally associated with magnetic tape recording. Recording and playback must take place during transient conditions which tend to separate the film from the recording head. For optimum magnetic recording under these conditions, the magnetic head must maintain contact of less than 20, and preferably 10, micro-inches spacing with the MOF layer.

Techniques for maintaining the desired relationship of the head to a magnetic coating in other traditional apparatus, are not practical for use with such filmstrips in a photographic still camera, particularly a compact camera. For example, in a sound movie camera, a cinematic film having a magnetic stripe along one edge is typically continuously moved over a drum, and information is recorded by a magnetic head positioned in close proximity to the drum. The drum provides a rigid support for the film, removes film curl and assures a uniform head to film relationship. While a fixed support such as a sound drum produces satisfactory results, the space limitations in a photographic still camera render such a support impractical. Also, a drum/head interface is not suitable under the transient conditions described above.

Furthermore, in a still camera system, it is desirable to record information pertinent to and immediately coincident with the photographic images captured by the camera because negative filmstrips are sometimes cut up in photofinishing, and other reasons described in the above-referenced '780 and '419 patents. In sound movie cameras, recorded information is displaced from the image to achieve continuous motion of the film during recording as compared with intermittent motion during exposure.

The prior art relating to recording on photographic film thus generally teaches providing a pressure pad support for the recording medium on the side opposite from the recording head and continuous motion of the recording medium to ensure reliable recording. In U.S. Pat. No. 5,097,278, various configurations for mounting a magnetic head in relation to the film transport path and film plane with the use of an oppositely disposed pressure pad are disclosed in a camera. In the above-referenced '780 patent, a different approach is taken wherein the record/reproduce head of the camera is positioned with respect to the chamber for receiving a modified film cartridge. The magnetic head bears against the MOF layer of a filmstrip exposed through an opening in the film cartridge lip while the film is supported and flattened within the lip, the emulsion bearing against a compliant support formed with a light blocking plush material overlying a lower flange of the cartridge lip.

Yet another head interface problem in application of this technology in compact photographic still cameras is that film motion takes place in a frame stepping mode by means of a pulse of tension (i.e., jerking or jogging motion). When the pulse of tension is applied to a stationary filmstrip, the film tension conditions are highly variable. In a traditional tape recorder, this condition would lead to an unstable interface. One approach for controlling the film tension could be a continuously energized servo-control system. This seems impractical considering the large power drain on the camera batteries that would be required to maintain the film tension.

SUMMARY OF THE INVENTION

The invention is directed to solving the above stated problems of recording and reproducing information on MOF layers of a filmstrip in a camera or in other filmstrip processing, handling or other apparatus while avoiding damage to the filmstrip in the image frame area.

It is therefore a primary object of the invention to enhance the compliance of a magnetic record and/or reproduce head with the MOF layer of a filmstrip for recording and/or reproducing information accurately in a plurality of tracks in the image area of the MOF layer without negatively affecting the quality of the photographic image.

The invention is realized in a first aspect in a record/reproduce apparatus for receiving an elongated filmstrip having a cross-curvature in the cross film direction and having a substantially transparent magnetic layer deposited on the film surface and for recording or reproducing information on or from the magnetic layer in relation to the image frames of the filmstrip and preferably comprises means for guiding the filmstrip advanced in a film transport path in a film plane from a filmstrip supply to a filmstrip takeup and through a recording and reproducing cavity, and a magnetic head aligned with the guiding means in the cross film direction and with respect to the cavity for contacting the magnetic layer of the filmstrip at a particular position in the cross film direction for recording or reproducing information, the magnetic head positioned to penetrate the film plane so that the filmstrip is diverted in the cavity and wraps around the magnetic head, the magnetic head further having a contoured profile in the film transport and cross film directions for ensuring a high degree of compliance of the magnetic head with the magnetic layer of the filmstrip at the particular position.

In a further aspect of the invention, the magnetic head preferably comprises a multi-head structure comprising a linear array of a plurality of magnetic record and/or reproduce heads mounted on a support to extend across the filmstrip wherein each of magnetic record/reproduce heads is contoured in the film transport and cross film directions to conform to the cross film curvature of the filmstrip as it is manifested within the film transport path at the cavity.

In a still further aspect of the invention, the plurality of record/reproduce heads are fabricated in the shape of a plurality of frustums including inner frustums supporting a plurality of active head gaps in an interior region in the cross film direction, and at least one further outer frustum on each side of the inner frustums in the cross film direction.

The frustums and active head gaps have a contoured height profile in the cross film direction positioned to penetrate the film plane and to wrap the filmstrip around the frustums in the cavity, the curved height profile in the cross film direction ensuring compliance of the active head gaps with the magnetic layer tracks.

The contoured profile of the head is preferably effected by mounting the magnetic head in operating relation to the guiding means and lapping the plurality of frustums and active head gaps with an abrasive strip exhibiting filmstrip cross-curvature passed through the guiding means in the path of transport of the filmstrip to lap down the frustum heights into a curvature conforming with the cross-curvature. Alternatively, the contoured profile of the magnetic head may be effected by machining or otherwise fabricating the frustums to the desired shape.

The invention is preferably implemented within a camera where the filmstrip is transported through a camera exposure gate for exposing image frames in the photosensitive layers of the filmstrip on the opposite side of the filmstrip from the MOF layer. The invention may also be practiced in other filmstrip transport apparatus associated with film manufacture in order to pre-record information in certain tracks or in processing of the exposed filmstrips to develop the image frames or in making prints from the image frames in order to record further information in other tracks or for any other reason that it may prove useful to read information from or write information into the tracks and read or record information into selected tracks of the MOF layer.

In accordance with the present invention, and due to the various features thereof, a head-to-film interface in the film transport path that enables near-contact compliance over the width of multiple head tracks, and over a large area around the individual magnetic head gaps, is achieved. The head-to-film interface is operable over the broad range of film cross-curvatures that might be encountered. In addition, the invention provides a stable recording interface insensitive to the transient nature of film tension, while the film is advanced from frame to frame. Furthermore, the interface does not require emulsion side support, nor does it generate any significant surface damage to the MOF surface in the image frame area.

These and other objects, advantages and features of the invention will be become apparent from the detailed description given hereinafter in relation to the accompanying drawings.

BRIEF DESCRIPTION OF THE DRAWINGS

FIG. 10 is a table of data derived from fabricating other embodiments of the multi-track linear head array of the invention as well as glass test mock-ups of such head arrays;

FIG. 12 is an interferogram of a compliance pattern observed in the tops of the frustums of an eight-track head array lapped to match the cross-curvature of a filmstrip in the cavity interface in accordance with the invention;

FIG. 13 is an interferogram of a compliance pattern observed in the tops of the frustums of an eight-track head having the additional frustums of the embodiment of FIGS. 7 and 11.

DETAILED DESCRIPTION OF THE PREFERRED EMBODIMENTS

Figure 1:
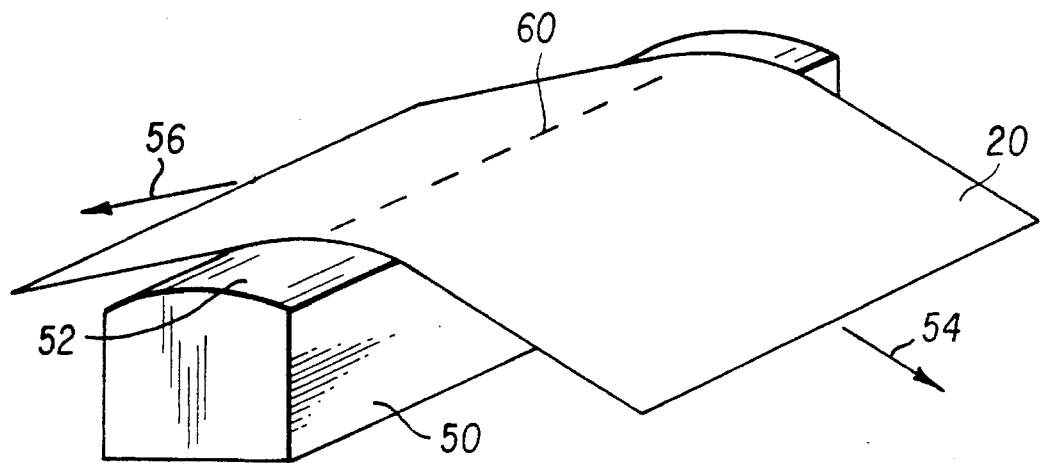
FIG. 1 is a perspective illustration of a typical wrap of a filmstrip around a continuous radius head to reduce cross-curvature.
Figure 2:
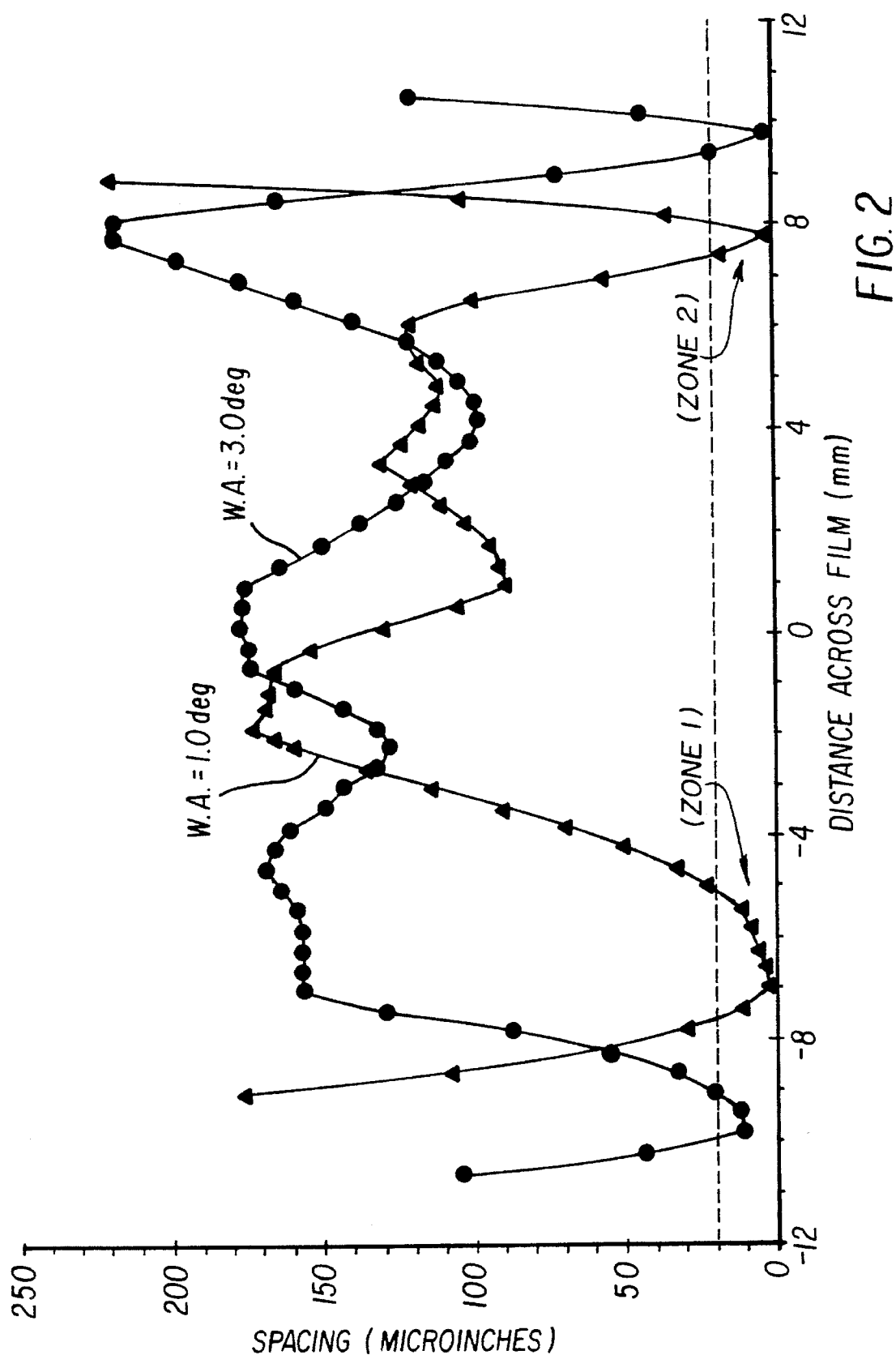
FIG. 2 is a graph depicting the spacing profile across the film along the gap line of a film wrapped around a typical continuous radius head at a 1° and a 3° wrap angle.
Figure 3:
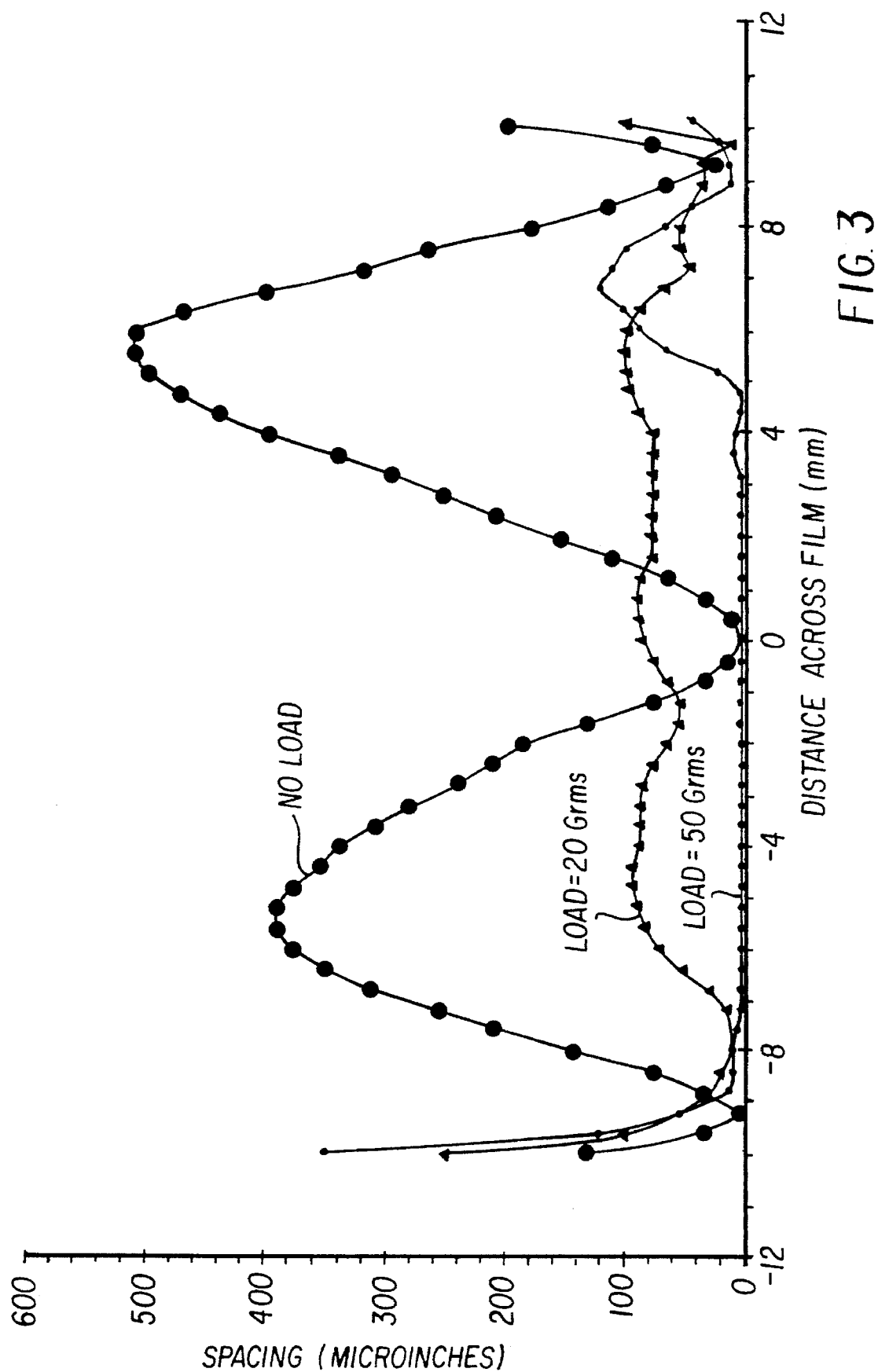
FIG. 3 is a graph depicting the spacing profile across the film along the gap line of a film wrapped around a typical continuous radius head at a 3° wrap angle and subjected to three different backing pressures.

In the experimental data set forth in FIGS. 1–3, it is demonstrated that a limited or partial compliance of the MOF tracks with a multi-head array is attained by bending the filmstrip 20 with a certain wrap angle around the recording head, which can be further improved with a pressure pad applied on the emulsion side of the filmstrip immediately opposite to region indicated by the gap line 60. Nevertheless, complete compliance is never attained for all tracks along the gap line 60. In accordance with the invention, a favorable compliance of the multi-head array with the MOF layer is attained without the use of a pressure pad.

FIGS. 4–8 show a first preferred embodiment of the invention implemented in a still camera having a camera film rail and gate frame 10 providing a filmstrip transport path. Gate frame 10 has parallel film rails 12 and 14 formed in an elongated channel 26 for receiving a filmstrip 20 and a curved depression or cavity 16 formed across the elongated channel 26. Filmstrip 20 is wrapped around a multi-head array 30 extending through a gap 42 in a platen 40 into the cavity 16 in accordance with the invention. The recording head 30 is supported in the gap 42 by a further saddle or head support member 38.

The filmstrip 20 is intended to extend between the film rails 12, 14 of and gate frame 10 and the platen 40 from a supply side 22, across the camera exposure gate 18 and the cavity 16, and to a takeup side 24. The filmstrip 20 is supported by the rails 12, 14 in the camera exposure gate 18, and is flattened in the film plane between the rails 12, 14 and the pressure plate or platen 40.

In this regard, the filmstrip is fabricated in such a way and positioned so that it always evidences a convex cross film curvature with the crown of the convex extending toward the elongated channel 26 in the gate frame 10. The platen 40 (shown in part in FIG. 5) may be retractable or fixed and may extend over the entire or part of the length of the gate frame 10, depending on the camera back cover and film loading design. When positioned or loaded, the platen 40 extends over a length of the gate frame 10 between the supply side 22 to the takeup side 24 and encloses the elongated channel 26 in the base 10 thereby defining the film transport path. Confining the filmstrip 20 in the film transport path defined by the gap between the elongated channel 26 and the platen 40, particularly at the filmstrip edges in contact with the rails 12, 14 leads to high tension and tends to flatten the cross-film curl of the filmstrip.

Thus, the platen 40 in the loaded position limits the film cross-curvature to the space defined by the facing surfaces of the platen 40, the rails 12, 14 and the gate frame 10 without allowing the filmstrip emulsion layers to contact the elongated channel 26 in the image frame area and be damaged. The design of such compact still camera film transport paths and mechanisms is well known in the art.

Figure 14:
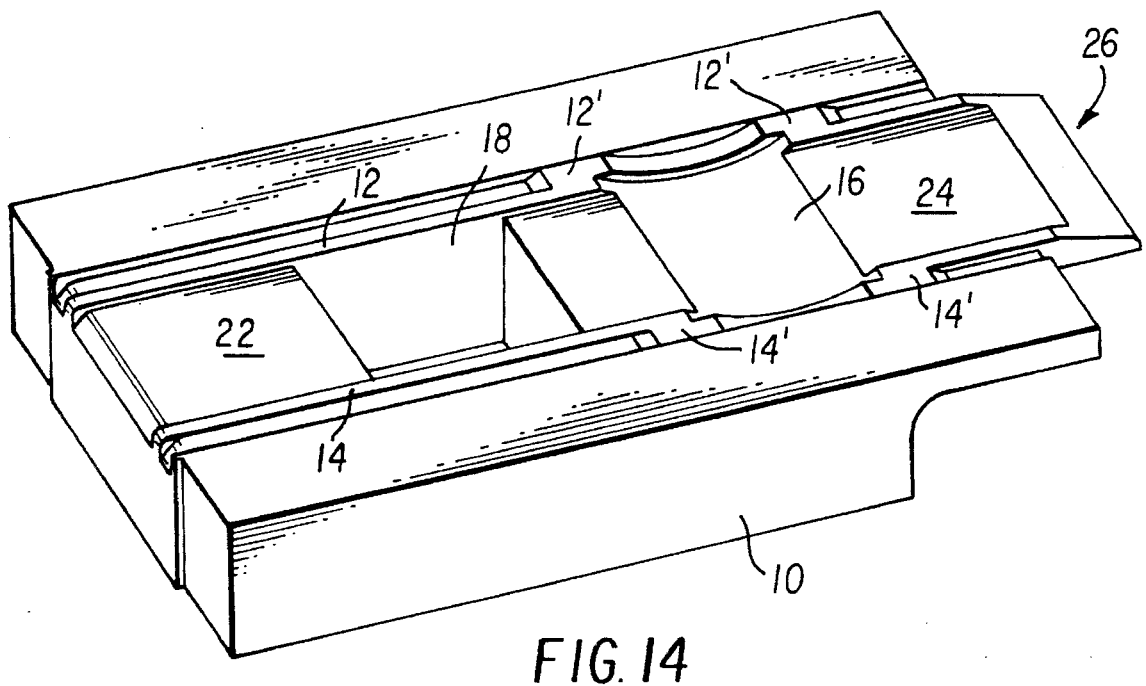
FIG. 14 is a perspective view of another embodiment of a modified camera film rail and gate frame in relation to a cavity therein for receiving the filmstrip deflectedby contact with the head.

Turning now to a first aspect of the invention, the gate frame 10 and the platen 40 are modified to provide a location for the mounting of the multi-head array 30 to achieve a high degree of compliance without resorting to any additional tension on the filmstrip or the use of a backing plate or roller or the like to apply pressure or load to the emulsion layer side of the filmstrip. In this regard, a cavity 16 is formed as a continuous curved surface, such as a partial cylinder or ellipse, recessed below the plane established by the film rails 12 and 14 by less than 5 mm. Cavity 16 extends in the film transport direction in the range from about 10 to 20 mm and extends across the film transport path the width of filmstrip 20. The film support rails 12, 14 follow the contour of the cavity 16 in this embodiment to protect the film surface from scratching when the filmstrip leader is threaded through the gate. The film support rails 12, 14 may be tapered in the segments extending through the cavity 16 to decrease local film tension, as shown in FIG. 14.

Figure 5:
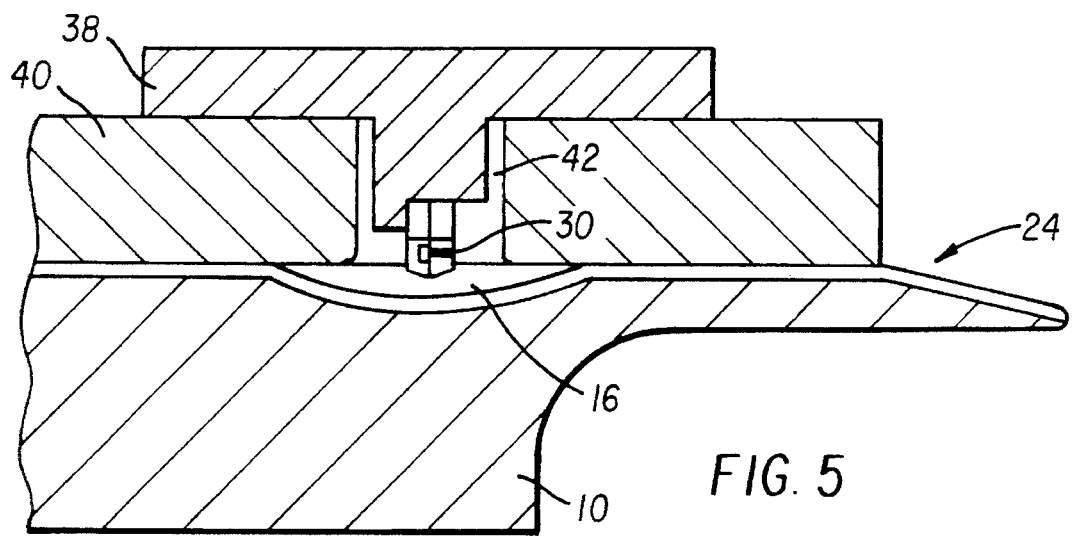
FIG. 5 is a partial, sectional view of the film transport path and head and cavity interface in the camera film rail and gate frame and platen.

As shown in FIG. 5, the platen 40 has a rectangular cut-out gap 42 over the cavity 16 into which the magnetic recording head is mounted. When mounted on the saddle 38 and in the gap 42, the magnetic multi-head array 30 extends across the filmstrip and penetrates into or breaks the film plane of the filmstrip 20 in the cavity 16. As the magnetic multi-head array 30 is penetrated into the film plane, the cavity 16 provides an adequate clearance between the emulsion side of the film and the surface of cavity 16, so that during filmstrip motion, the possibility of film scratching is eliminated.

Figure 6:
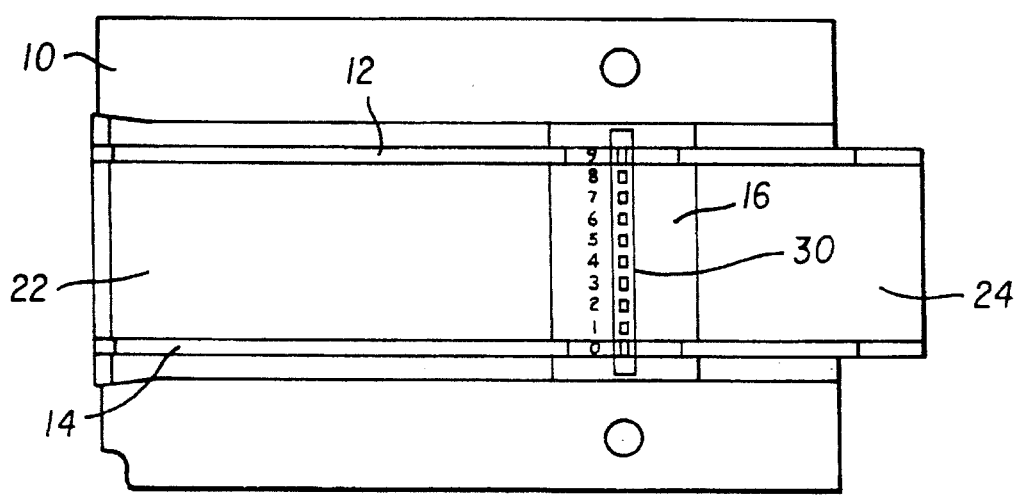
FIG. 6 is a top view of the relative positioning of the multi-track head with respect to the cavity of the camera film rail and gate frame of FIG. 4.
Figure 7:
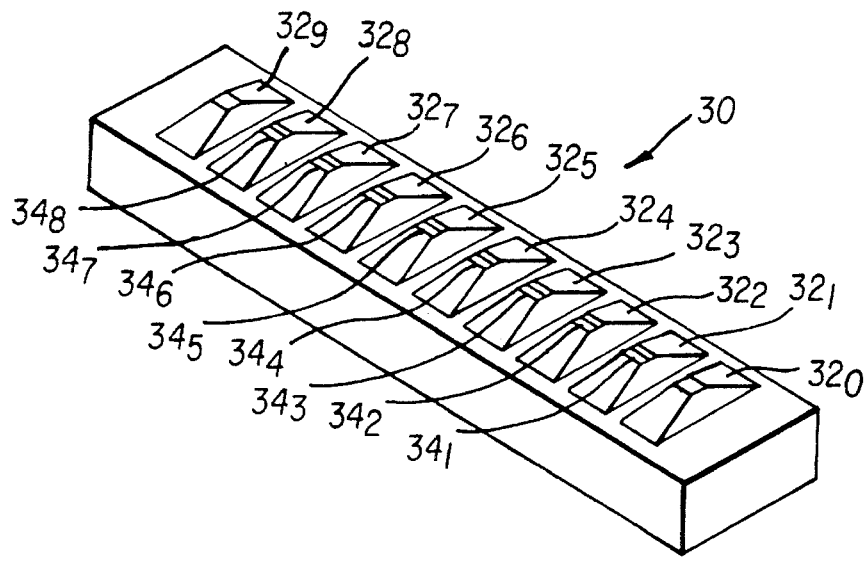
FIG. 7 is a perspective schematic view of the frustums of one embodiment of a multi-head array formed in accordance with the invention.

The camera film rail and gate frame 10, shown in FIG. 6, is especially useful for thrust type action cameras (i.e., cameras that use leaderless film cartridges of the type described in commonly assigned U.S. Pat. No. 5,049,914, incorporated herein by reference) wherein the filmstrip exhibits the consistent direction of cross film curvature mentioned above. The filmstrip 20 has a continuous MOF layer deposited on the non-emulsion side on which data may be recorded. As illustrated and described in the above-referenced '780 and '419 patents, a plurality of MOF layer recording areas $28_1 \ldots 28_n$ are formatted in which data relating to an image frame may be recorded in the tracks aligned with the active head gaps of the multi-head array 30. Pre-recorded information in some of the MOF layer image area tracks may also be read out by the discrete active gap heads of the multi-head array 30.

The leading edge of the filmstrip 20 is thrust forward from the filmstrip supply side 22 to the takeup side 24 through the space bounded by the facing surfaces of the rails 12, 14 and the platen 40. The inherent or core-set curl of the filmstrip 20 enables the leading edge to follow the curvature of the cylindrical cavity 16 and thread its way between the multi-head array 30 and the cavity 16 walls, without needing to retract the multi-head array 30. The film base and layer stiffness prevents the filmstrip 20 from buckling as it exits the cylindrical cavity 16 interface with the multi-head array 30 and threads its way downstream of the multi-head array 30 to a takeup spool (not shown, beyond the filmstrip takeup side 24), where it is caught on loading.

The existence of the gate rails 12, 14 and platen 40 on either side of the cavity 16 enables the filmstrip 20 to accurately wrap around the contour of the multi-head array 30. The magnetic multi-head array 30 penetrates the film plane a depth to create a uniform wrap angle of between 0.5° to 4.5° of the leading and trailing filmstrip wrapped around the multi-head array 30 within the cavity 16. This ensures that the narrow region of contact between the filmstrip 20 and the multi-head array 30 is directly over the magnetic head gaps.

FIG. 6 shows the relative positions of the tracks of the multi-head array 30 in relation to the filmstrip transport path, specifically the parallel film rails 12 and 14 and the cavity 16 in a portion of the frame 10. As described below, the magnetic multi-head array 30 of the depicted example is formed in a linear array of discrete heads in the shape of n=10 frustums $32_0$–$32_9$ containing eight active head gaps $34_1$–$32_8$. The tracks to be recorded on the MOF layer areas $28_n$ of the filmstrip are numbered 1–8.

Figure 4:
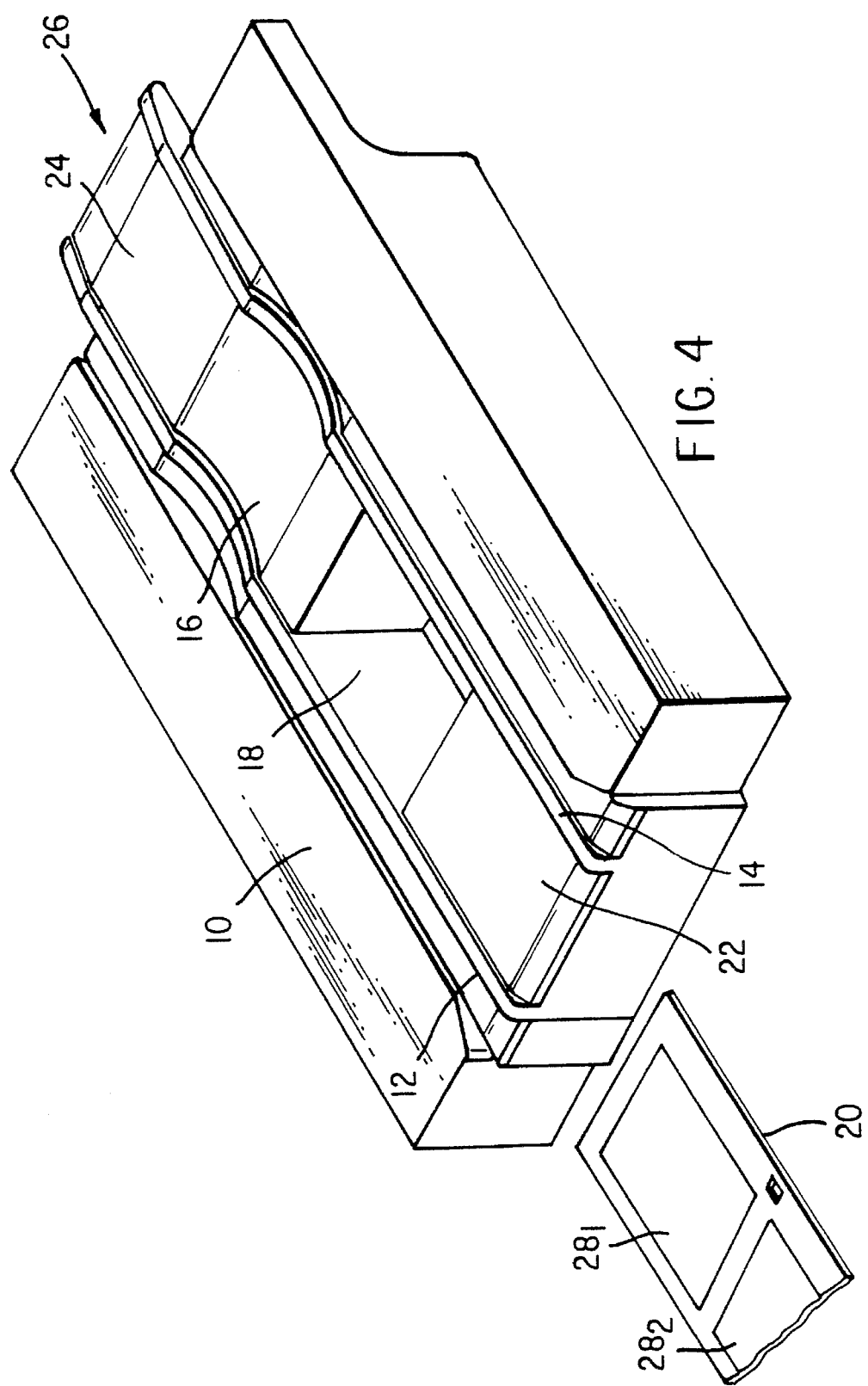
FIG. 4 is a perspective view of a camera film rail and gate frame in relation to a cavity therein for receiving the filmstrip deflected by contact with the head.

FIGS. 4–6 thus show the relationship between the camera gate 10, the platen 40, and the magnetic multi-head array 30 defining a filmstrip transport path and film plane for the filmstrip 20. The key feature of this design configuration is that the penetration of the multi-head array 30 into the film plane takes advantage of the filmstrip substrate bending stiffness by causing the filmstrip 20 to bend or buckle within the cavity 16 and wrap around the multi-head array 30 to provide a spring load against the head gaps sufficient to generate a pressure contact at the interface of less than 30 PSI (21 KPa). Because of this natural spring load, no media (i.e., film) tension is required to establish and maintain a robust interface, and the compliance is furthermore enhanced once a pulse of tension is applied to the filmstrip to provide frame stepping motion. The self threading advancement of the filmstrip 20 along the rails 12 and 14 on either side of the multi-head array 30 is effected without binding or jamming of the filmstrip, and the magnetic multi-head array 30 need not be retracted.

Turning to a second aspect of the invention compliance across the width of the filmstrip by each of the active heads of the multi-head array 30 is improved even further by contouring the multi-head array in the film width or cross film direction, as well as the film length or transport direction. In a preferred embodiment of the invention, the magnetic multi-head array 30 is best described as a multiplicity of frustums $32_n$, e.g. n=10, formed as shown schematically in FIG. 7 and in one embodiment in FIG. 8, that are then contoured to a shape described in FIGS. 9–13. The frustums $32_n$ are in the shape of right quadrangular pyramids, each having a rectangular top. The width of the top of each frustum (in the track width direction) ranges from about 0.381 to 1.0 mm, whereas the length ranges from about 0.381 to 1.0 mm. The lateral faces of each frustum $32_n$ are inclined to the base of the frustum at the plane angle ranging from about 10° to 30°, however a larger plane angle is also contemplated if the top edges are further rounded.

The depicted eight central frustums $32_1$–$32_8$ are formed around active head gaps $34_1$–$32_8$, therefore defining eight active heads 30 (i.e., heads that record and/or reproduce). The outermost frustums $32_0$ and $32_9$ do not contain active heads, and exist simply to stabilize the filmstrip cross-curvature for the active heads. When only active frustums are used, compliance problems are experienced by the outer tracks due to the continuously varying film cross-curvature as shown below by comparison of FIGS. 12 and 13. The provision of two "dummy" frustums $32_0$ and $32_9$ at the outside or shoulder also improves the condition for contouring the active head frustums $32_1$–$32_8$.

The head gap dimensions are dependent on the recording wave length. For 8,000 FCI, the gaps are from about 2.0 to 5.0 microns, whereas for 16,000 FCI, the gap can be from about 1.2 to 2.1 microns. The multi-head array 30 may be constructed to act as an active write and/or read multi-head array.

Figure 8:
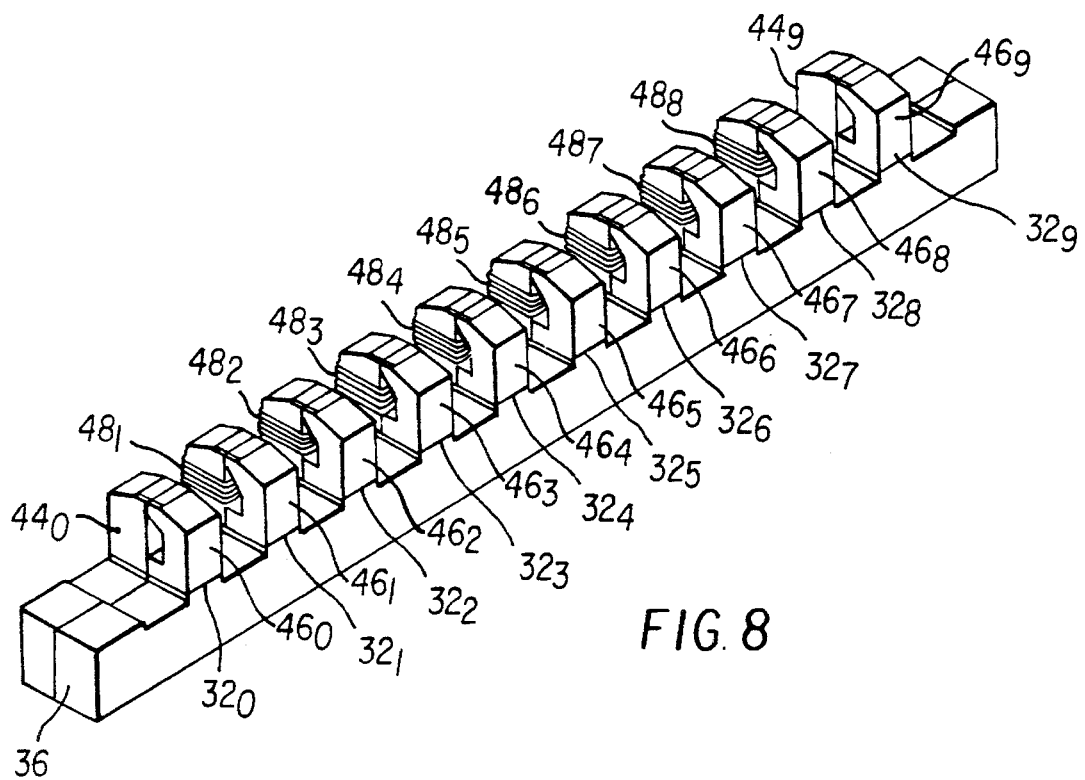
FIG. 8 is a perspective view of one embodiment of a magnetic multi-head array that may be shaped with the frustums of FIG. 7 and contoured in accordance with the invention.

FIG. 8 shows a multi-head array 30 constructed of ferrite core heads $32_0$–$32_9$ formed on a substrate 36 each dimensioned as above and having a relatively uniform height profile. Each head 32 is formed of a straight half core element 44 and a C-shaped half core element 46 jointed together to form the head gap 34 in the frustum shape of FIG. 7. A copper wire coil 48 is wrapped around the straight half core element 44 to provide a field at the gap 34 in a manner well known in the art. The gaps $34_0$–$34_9$ each have a certain gap height where the top side of the C-shaped half core element 46 abuts the side of the straight half core element 44. The two outer ferrite core heads $32_0$ and $32_9$ act as dummy heads and are not provided with a wire coil 48. The substrate 36 may be attached to the head support member 38.

The contouring of the head frustums $32_n$ in accordance with the invention is obtained by "lapping-in" the head frustums on a fixture corresponding to the actual camera gate frame 10, multi-head array 30 and platen 40 arrangement of FIGS. 4–7. A multi-head array 30 to be lapped-in is mounted into the gap 42 in the platen 40 of the fixture and penetrated into the cavity 16 at the same position of its intended use in the actual camera (or other apparatus) as shown in FIG. 5. In a first lapping method, a photographic filmstrip and an abrasive filmstrip are passed together through the film transport path of the camera frame emulating fixture. The abrasive film is mated with the filmstrip so that the abrasive film faces the multi-head array 30 to be lapped, and the photographic film bears against the rails 12, 14. In this manner, the contour of the multiple frustum head is lapped to match the cross-curvature of the filmstrip. The head is lapped until the initially high pressure points of contact are abraded down and all of the active frustums are carrying an equivalent pressure. As expected, the initial high pressure points are located at the outermost track regions corresponding to the dummy frustums $32_0$ and $32_9$ in the example of FIG. 7. These high pressure points are caused by the cross-curvature of the filmstrip and by the high tension near the gate rails 12, 14. In this fashion, the apparatus of FIGS. 4–7 may be employed in the lapping process.

Figure 9:
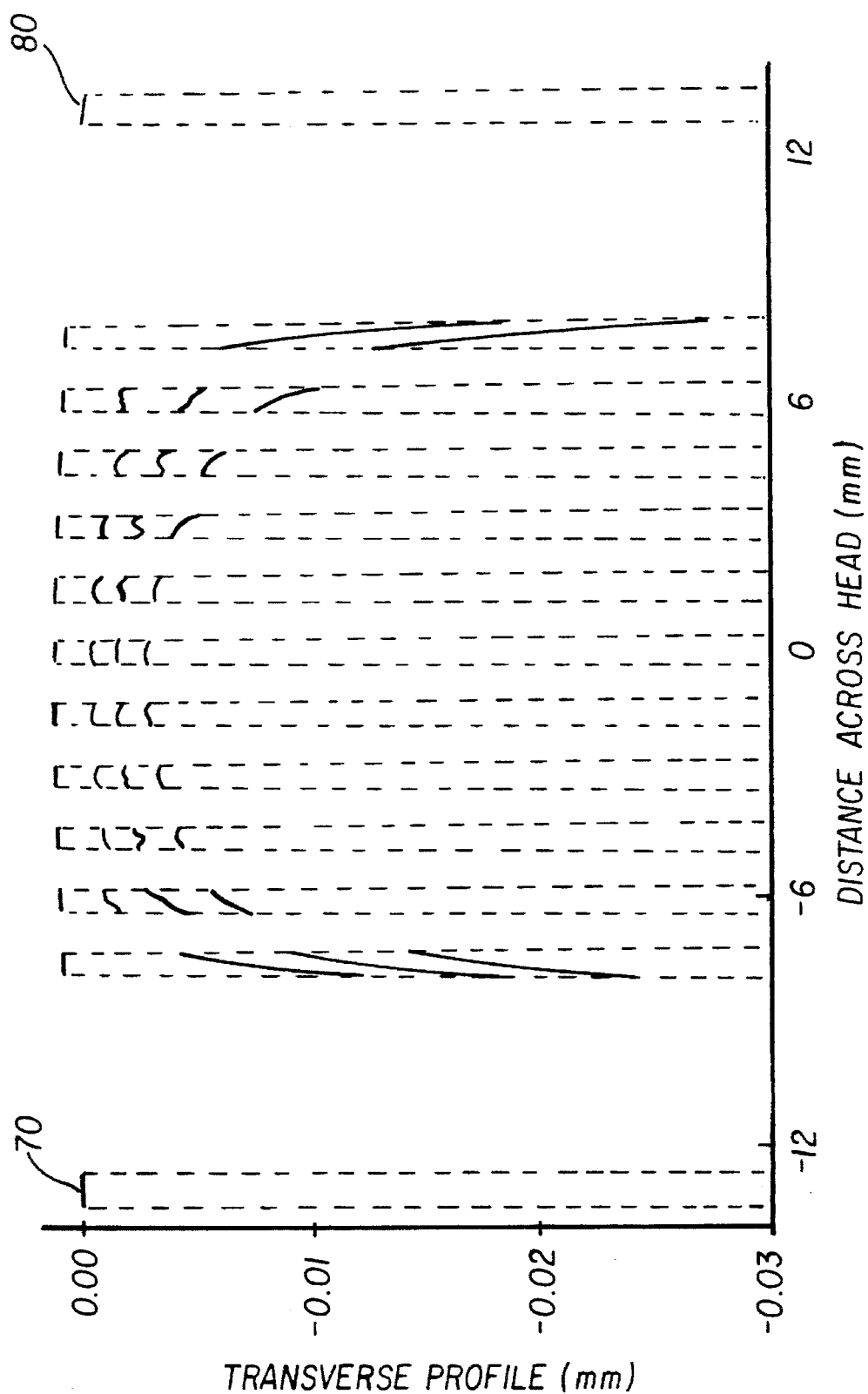
FIG. 9 is a chart illustrating the transverse profiles of the frustums of the multi-track head array achieved during successive stages of the contouring process in accordance with the invention.

In experiments conducted using the first method, a 24 mm wide filmstrip of 100 micron thickness, interposed by a 25 micron thick diamond abrasive tape, was employed to lap an 11 frustum head under the conditions set forth in FIG. 9. The beginning head radius was 20 mm, and the frustums $32_0$–$32_{11}$ in this example were machined to 0.64 mm by 0.76 mm on a pitch of 2 mm as shown in FIG. 6. The lateral faces of the frustums are also at a 20° angle to the base in this example.

It should be noted that the vertical scale is exaggerated considerably with respect to the horizontal scale in FIG. 9 in order to show all the frustum height profiles on a single page. The vertical scale of the graph provides the range of 30 microns, whereas the horizontal scale has 28 mm of range along the length of the multi-head array 30.

FIG. 9 shows a sequence of four measurements of the transverse (widthwise) height profiles of such a multi-head array. The profiles were taken at four stages of the lapping process to demonstrate the evolution of the cross-curvature from the initial profile to the final contour. Two external, non-lapped surfaces 70 and 80 located at −13 and +13 mm X-coordinates on the common base of the multi-gap head array, are shown in FIG. 9 to reference the transverse height profiles of the frustums at each lapping stage to the initial contour of the head. The initial profiles of the frustums $32_0$–$32_n$ in this example extend between the two external, non-lapped surfaces 70 and 80 and are each relatively straight and flat, although the array does show some slight convex bowing centered at point "O" or $32_6$ due to manufacturing tolerances.

The successive transverse profiles show a pronounced increase in height wear lapping of the outer frustums $32_0$ and $32_{11}$ as the lengths of the abrasive tapes run through the fixture are increased from the first lapping using 10 feet of 6 micron grit diamond tape through the second and final lappings using 20 feet of 3 and 1 micron grit diamond lapping tape, respectively. The three different diamond abrasive lapping tapes were therefore used to generate the final cross-curvature: 6, 3 and 1 micron grit on the 25 µm thick PET tape base for a total of 50 feet.

Preferably, in the method employed with the various multi-head array systems, the photographic filmstrip tension is under 12 g/mm, and the abrasive tape tension is under 5 g/mm. Very low tension is applied to the diamond lapping tapes in order to preserve the pressure distribution provided by the filmstrip. The abrasive tape backing is preferably less than 76 microns thick. The choice of abrasive tape backing thickness is important in achieving the desired combination of head contour and edge blending. By proper selection of the thickness of the abrasive tape backing, either more or less edge rounding can be achieved of each frustum $32_1$–$32_{10}$. Some edge rounding or blending, as shown in FIG. 9 at each lapping stage, is desirable because it minimizes the film scratching potential of each individual head. However, too much rounding of the frustum edges can result in spacing loss around the edges of the individual track widths. This same over-blending of the frustum edges can occur if excess abrasive tape tension is used when abrading the head.

FIG. 10 is a table showing lapping fabrication data for multi-head arrays 30 fabricated of Mn-Zn ferrite and $Al_2O_3$-TiC, as well as dummy head arrays fabricated of borosilicate glass. The multi-head arrays were fabricated in several configurations for differing track numbers on the filmstrip MOF layer, such as a 12 frustum head at 1.5 mm pitch, a 10 frustum head at 2 mm pitch and a 17 frustum head at 1 mm pitch. The head arrays were lapped under the listed conditions at the film plane penetrations listed in FIG. 10.

Figure 11:
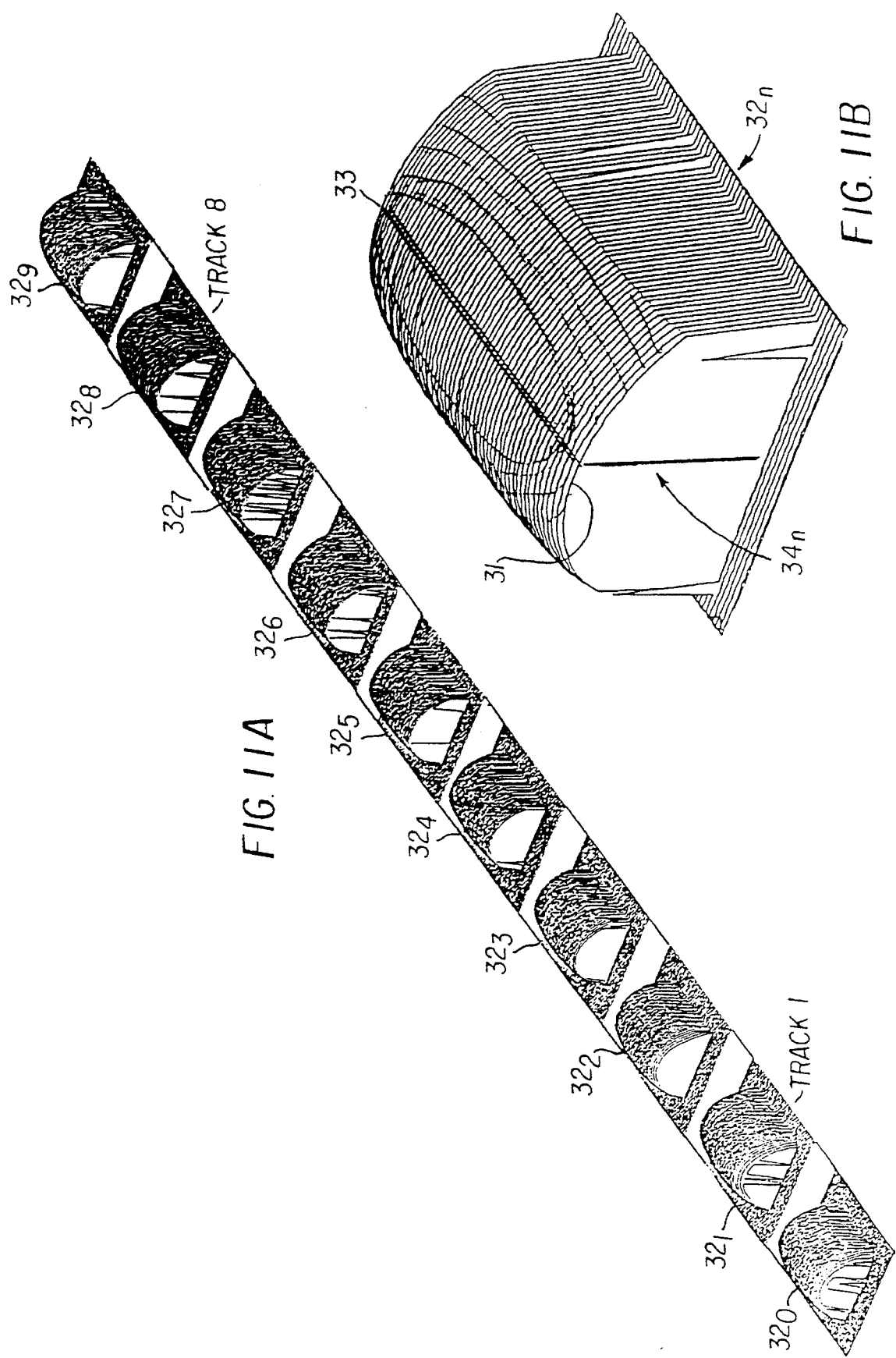
FIG. 11 is a computer drawn perspective view of the large radius, prolate ellipsoidal shapes on the tops of the frustums of an eight-track, active gap multi-head array with .a pair of outer stabilizing frustums lapped to match the cross-curvature of a filmstrip in the cavity interface in accordance with the FIG. 7 embodiment of the invention as well as a before and after illustration of the shapes an exemplary one of the eight heads.

The magnetic multi-head array 30 with the multi-track, record/reproduce, frustum shaped, discrete heads created by these methods comprises a plurality of compound, three dimensional bearing surfaces formed by the shallow cylindrical frustums around the head gap lines with frustum wall angles of less than about 30° to create localized pressure zones when penetrated into the film plane at the cavity interface. FIG. 11 is a further view, derived by surface mapping, of the typical profiles of the head frustums $32_0$–$32_9$ of a typical ten discrete head array lapped by these processes.

The lapping-in process produces individual, large radius, prolate ellipsoidal shapes on the tops of the frustums of the active heads as indicated in the magnified view in FIG. 11. The individual frustums $32_1$–$32_8$ of the ten head system have bearing surface areas of about 0.75 mm wide in the cross film direction and 0.64 mm long in the film transport direction, with the magnetic gap line located symmetrically within the 0.64 mm dimension. The frustum edges, e.g. 31, 33, are blended or rounded to eliminate film scratching (as also shown in FIG. 9), and the resulting frustum head bearing surfaces are prolate ellipsoids having discrete radii of 12.7 mm (0.5 inch) to 25.4 mm (1.0 inch) in the film transport direction, and between 152 (6.0 inch) to 254 mm (10.0 inch) in the cross film direction. In addition to providing good compliance, this shape reduces the likelihood of the head frustums $32_0$–$32_9$ scratching the filmstrip in the critical image frame area. It should be noted that the surface mapping technique employed to derive the FIG. 11 views depicts the depths of lapping achieved over the majority of the frustum surface but shows an exaggerated edge fall-off that may actually be more gradual and blended at edges 31 and 33 as well as the other edges.

The compliance patterns shown in FIGS. 12 and 13 are interferograms showing the gap spacing at the interface between a glass head array mock-up fabricated by the above described lapping processes. The glass head array allows direct viewing of the compliance of the lapped head surfaces with a photographic filmstrip 20 advanced through the filmstrip transport path described above with respect to FIGS. 4–8. Similar views may be derived employing a transparent film base and transparent camera film rail and gate frame 10. In either case, FIGS. 12 and 13 depict the compliance of the individual head surfaces penetrated into the plane of filmstrip at the optimal operating conditions for 8 and 10 head arrays, respectively. These interference fringe patterns are used to judge the performance of the interface obtained by the lapping process. The central zero order fringe of the pattern represents an apparent full and even contact with the filmstrip (zero gap spacing), whereas the higher order fringes show gap spacings with a spacing step of 0.25 microns.

With respect to the system reliability and functionality, it is desirable to provide an in-contact compliance zone throughout the bearing surface of the frustum. However, the edges and the corners of the bearing surface of each frustum, which act as pressure concentrators, should be separated by a minimum spacing step of about 0.25 microns in order to minimize the probability of film scratching.

FIGS. 12 and 13 also illustrate the improvement in compliance between an 8 and a 10 frustum head design lapped in accordance with the methods of the experiments described above. The region of highest wear is noted to be on head tracks 0 and 9 of the 10 frustum head design and 1 and 8 of the eight frustum head design which are the outermost track regions closest the gate rails 12, 14. Providing the outermost frustums of FIG. 13 as dummy frustums $32_0$ and $32_9$ ensures that the eight inner frustums $32_1$–$32_8$ provide highly compliant head gaps $34_1$–$34_8$, and avoids the somewhat poorer compliance of the outer frustums of FIG. 12.

A difficulty may arise in lapping the dummy frustums $32_0$ and $32_9$, as severely as indicated in FIGS. 9 and 12. Some magnetic record and/or reproduce heads have a tight tolerance range on the gap depth dimension. This required tolerance range may conflict with the degree of lapping needed to achieve desired multi-track cross-curvature. For these types of tight tolerance heads, the multi-head array 30 contour is more easily produced if the filmstrip 20 cross-curvature can be minimized through the cavity 16.

One method of achieving less film cross-curvature in the context of the camera film transport mechanism of FIGS. 4–8 is to widen the location of the film support rails 12, 14 near the head position in the cavity 16. The film support rails 12, 14 in the film transport path areas on either side of cavity 16 remain in their normal position as in FIG. 14. However, the film support rail segments 12', 14' bridging the cavity 16 are moved outward. This moves the higher tension region outward of the dummy head frustums 320 and 329, and reduces the cross-curvature of the head contour.

An alternate method of lapping-in the contours of the above described multi-head systems is to replace the interposed lapping film and photographic film with a single abrasive film having a base substrate with similar bending stiffness to that of the intended photographic film. This eliminates the need of using the photographic filmstrip in order to achieve the desired contour. In another alternate method standard-backed lapping film can be employed using the tension applied to the lapping film as a means for influencing the final contour shape.

In another alternative method, the contour of the film base may be reproduced in a machined rigid tooling plate positioned in the fixture in the cavity interface position to also replace the photographic film.

The resulting contour dimensions from the lapping-in can also be produced by other means that do not involve the abrasive film techniques. For instance, the desired head cross-curvature can be produced by assembly of individual head elements to the relative heights and edge blendings shown, for example, in FIG. 9. The desired cross-curvature for each head could also be precision form ground. In both of these cases, however, some light lapping-in would most likely be required to round or blend the edges of the heads to prevent scratching in the film image area.

When photographic film is exposed to varying environmental conditions and/or time, the free-state cross-curvature is affected. These changes in cross-curvature create a concern for the head-to-film compliance. However, by using the techniques described above, the head-to-film compliance is maintained, even when using photographic films that have widely different free-state cross-curvatures. This film insensitivity can be largely attributed to the flattening effect of the head penetration into the filmstrip transport path and the diversion of the film plane. The filmstrip is caused to buckle as it is advanced around the penetrating head and stiffens the filmstrip and provides a spring load against the head. The spring load eliminates any need for film tension and overcomes any additional age related filmstrip cross-curvature.

It has been observed that the heads lapped-in on a particular type of filmstrip base or exhibiting a certain degree of cross curvature can be used with satisfactory compliance with filmstrips of the same or different type, exhibiting a greater or lesser degree of cross curvature. In other words, the head arrays produced to exhibit the characteristics described above, when mounted to penetrate the film plane of a filmstrip restrained at the filmstrip edges in the manner described above, provide robust compliance performance without damaging the filmstrip surface for a wide variety of filmstrips.

What has been described is the contouring of, and methods and apparatus for contouring, a magnetic multi-head array to match the cross-curvature of a photographic film in a film transport path, particularly a still camera. These same methods and apparatus can be used with other combinations of photographic film in drives, cameras, readers, and/or scanners. In addition, the methods and apparatus disclosed may be used to contour combination read/write heads with more than one parallel gap. These techniques produce a head contour that has good compliance to the MOF surface with a uniform pressure distribution and an absence of high pressure regions (such as sharp corners and edges) that could cause film damage.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–14 camera film rail and gate frame 10
parallel film rails 12 and 14
outer film rail segments 12', 14'
cavity 16
exposure gate 18
filmstrip 20
filmstrip supply side 22
filmstrip takeup side 24
elongated channel 26
MOF layer areas $28_{1-n}$
multi-head array 30
blended surface edges 31, 33
frustums $32_0$–$32_9$
active head gaps $34_1$–$34_8$
substrate 36
head support member 38
platen 40
platen gap 42
straight half core element 44
C-shaped half core element 46
coil 48
magnetic tape head 50
contour surface 52
tension arrows 54, 56
gap line 60
external, non-lapped surfaces 70 and 80

We claim:

1. A magnetic record/reproduce system for recording and/or reproducing information in relation to image frames of a photographic filmstrip in a substantially transparent magnetic layer on a surface of the photographic filmstrip, the filmtrip having a cross-curvature in the cross film direction across the width of said filmstrip, comprising:
    means for defining an elongated filmstrip transport path tending to straighten and flatten said filmstrip to conform with a film plane and having a record/reproduce cavity therein;
    means for advancing the filmstrip in a film transport direction in said film plane from a filmstrip supply to a filmstrip takeup and through said record/reproduce cavity, whereby said filmstrip extending across said cavity exhibits cross-curvature in said film plane;
    a magnetic head for contacting the magnetic layer for recording or reproducing information, said magnetic head having a contoured profile in said cross film direction conforming with said filmstrip cross-curvature for ensuring elastic compliance of the cross-curvature of said filmstrip with said elongated magnetic head; and means for positioning said magnetic head with respect to said filmstrip transport path and said record/reproduce cavity to penetrate said film plane and divert said filmstrip, whereby said filmstrip is diverted in said record/reproduce cavity and wraps around said magnetic head in compliance with said head in the film transport and cross film directions.

2. The system of claim 1, wherein said magnetic head includes an elongated multi-head array having a plurality of active heads spaced apart in said cross film direction for recording and/or reproducing information in a corresponding plurality of magnetic layer tracks as said filmstrip is advanced past said elongated multi-head array.

3. The system of claim 2, wherein said plurality of active heads are supported in an interior region in said cross film direction and at least one further outer dummy head is positioned in said array on each side of said active heads in said cross film direction.

4. The system of claim 3, wherein said outer dummy heads and said active heads have contoured height profiles in said cross film direction conforming with the cross-curvature of the filmstrip in said record/reproduce cavity and are positioned by said positioning means to penetrate said film plane and to wrap said filmstrip around said heads in said cavity, said contoured height profiles in said cross film direction ensuring compliance of said active heads with said magnetic layer tracks.

5. The system of claim 4, wherein said outer heads have height profiles less than the height profiles of said active heads, whereby said multi-head array exhibits a composite convex profile conforming to a convex cross-curvature of the filmstrip in said film plane.

6. The system of claim 5, wherein said height profiles are effected by providing said multi-head array as a plurality of active and dummy, frustum shaped heads exhibiting about the same profile positioned by said positioning means in operating relation to said cavity, and by lapping said plurality of frustum shaped heads with an abrasive tape exhibiting filmstrip cross-curvature advanced by said filmstrip advancing means to lap the frustum height profiles into a curvature conforming with said filmstrip cross-curvature.

7. The system of claim 5, wherein said height profiles are effected by machining said plurality of active and dummy heads in a pattern conforming with the cross-curvature of said filmstrip.

8. The system of claim 2, wherein said elongated multi-head array further comprises a compound, three-dimensional bearing surface further comprising a plurality of shallow contoured active heads mounted in a linear array in said cross film direction supporting a plurality of active head gaps and surface shaped to create localized pressure regions when penetrated into the film plane.

9. The system of claim 8, wherein said shallow contoured heads have cross film and film transport path direction side walls and an upper bearing surface area from about 0.381 to 1.0 mm in the cross film direction by about 0.381 to 1.0 mm in the film transport path direction and penetrating said film plane with head side wall angles of less than 30°.

10. The system of claim 9, wherein the upper bearing surface areas of the contoured heads is curved into said head side walls in the cross film and the film transport path directions.

11. The system of claim 9, wherein the upper bearing surface areas of the contoured heads are contoured in the film transport path direction as prolate ellipsoids having radii of between 12.7 to 25.4 mm in the film transport path direction and between 152 to 254 mm in the cross film direction.

12. The system of claim 11, wherein said contoured profile in said cross film direction and said prolate ellipsoid surface area shapes are effected by providing said multi-head array as a plurality of active, frustum shaped heads exhibiting about the same profile positioned by said positioning means in operating relation to said record/reproduce cavity, and by lapping said plurality of frustum shaped heads with an abrasive tape exhibiting filmstrip cross-curvature advanced by said filmstrip advancing means to lap the frustum height profiles into a curvature conforming with said filmstrip cross-curvature.

13. The system of claim 12, wherein said plurality of active heads are supported in an interior region in said cross film direction and at least one further outer dummy head is positioned in said array on each side of said active heads in said cross film direction.

14. The system of claim 1 wherein said transport path defining means includes:

a base having a filmstrip supply side and a filmstrip takeup side;

an elongated channel formed in said base of a width accommodating the width of said filmstrip;

a pair of elongated film rails extending in parallel between said filmstrip supply side and a filmstrip takeup side in said elongated channel and separated apart to contact the edges of said filmstrip;

a curved cavity formed in said elongated channel at a cavity interface position; and a platen positionable over said elongated channel in said base for forming a film transport path by restraining and flattening said filmstrip edges against said rails and across said cavity during transport of said filmstrip through said channel and cavity; and wherein said positioning means includes:

means formed in said platen for supporting said record/reproduce head in said cross film direction in said cavity interface position for penetrating into said cavity a distance to allow wrapping of said filmstrip around said head penetrating into said film plane.

15. The system of claim 14, wherein said magnetic head comprises an elongated multi-head array which further comprises a plurality of active heads spaced apart in said cross film direction for recording and/or reproducing information in a corresponding plurality of magnetic layer tracks as said filmstrip is advanced past said elongated multi-head array.

16. The system of claim 15, wherein said plurality of active heads are supported in an interior region in said cross film direction and at least one further outer dummy head is positioned in said array on each side of said active heads in said cross film direction.

17. The system of claim 16, wherein said outer dummy heads and said active heads have contoured height profiles in said cross film direction conforming with the cross-curvature of the filmstrip in said record/reproduce cavity and are positioned by said positioning means to penetrate said film plane and to wrap said filmstrip around said heads in said cavity, said contoured height profiles in said cross film direction ensuring compliance of said active heads with said magnetic layer tracks.

18. The system of claim 17, wherein said outer heads have height profiles less than the height profiles of said active heads, whereby said multi-head array exhibits a composite convex profile conforming to a convex cross-curvature of the filmstrip in said film plane.

19. The system of claim 18, wherein said height profiles are effected by providing said multi-head array as a plurality of active and dummy, frustum shaped heads exhibiting about the same profile positioned by said positioning means in operating relation to said cavity, and by lapping said plurality of frustum shaped heads with an abrasive tape exhibiting filmstrip cross-curvature advanced by said filmstrip advancing means to lap the frustum height profiles into a curvature conforming with said filmstrip cross-curvature.

20. The system of claim 18, wherein said height profiles are effected by machining said plurality of active and dummy heads in a pattern conforming with said cross-curvature of said filmstrip.

21. A photographic still system for receiving an elongated filmstrip having a cross-curvature in the cross film direction across said filmstrip and having a substantially transparent magnetic layer deposited on the film surface and for recording or reproducing information on or from the magnetic layer in relation to the exposure of image frames of the filmstrip, comprising:

a base having a filmstrip supply side and a filmstrip takeup side;

an elongated channel formed in said base of a width accommodating the width of said filmstrip;

a pair of elongated film rails extending in parallel between said filmstrip supply side and a filmstrip takeup side in said elongated channel and separated apart to contact the edges of said filmstrip;

a curved cavity formed in said elongated channel at a cavity interface position;

an elongated multi-head array aligned in said cross film direction with respect to said cavity for contacting the magnetic layer for recording or reproducing information, said multi-head array having a contoured profile in said cross film direction for ensuring elastic compliance of the cross-curvature of said filmstrip with said elongated multi-head array;

a platen positionable over said elongated channel in said base for forming a film transport path by restraining and flattening said filmstrip edges against said rails and across said cavity during transport of said filmstrip through said channel and cavity; and means for positioning said magnetic head with respect to said filmstrip transport path and said record/reproduce cavity to penetrate said film plane and divert said filmstrip, whereby said filmstrip is diverted in said record/reproduce cavity and wraps around said magnetic head in compliance with said head in the film transport and cross film directions while being urged into said film plane by said elongated film rails.

22. The system of claim 21, wherein said positioning means positions said head within said film plane to effect a film wrap angle of said filmstrip in the range of about 0.5° to 15.0°.

23. The system of claim 21, wherein said pair of elongated film rails extending in parallel between said filmstrip supply side and said filmstrip takeup side in said elongated channel are separated apart a first dimension to contact the edges of said filmstrip and are separated apart a second dimension adjacent to said curved cavity to minimize film tension and cross-curvature during passage of said filmstrip through said curved cavity.

24. The system of claim 21, wherein said pair of elongated film rails extending in parallel between said filmstrip supply side and said filmstrip takeup side in said elongated channel end at said curved cavity to minimize film tension and cross-curvature during passage of said filmstrip through said curved cavity.

25. The camera of claim 21, wherein said magnetic head comprises an elongated multi-head array which further comprises a plurality of active heads spaced apart in said cross film direction for recording and/or reproducing information in a corresponding plurality of magnetic layer tracks as said filmstrip is advanced past said elongated multi-head array.

26. The camera of claim 25, wherein said plurality of active heads are supported in an interior region in said cross film direction and at least one further outer dummy head is positioned in said array on each side of said active heads in said cross film direction.

27. The camera of claim 26, wherein said outer dummy heads and said active heads have contoured height profiles in said cross film direction conforming with the cross-curvature of the filmstrip in said record/reproduce cavity and are positioned by said positioning means to penetrate said film plane and to wrap said filmstrip around said heads in said cavity, said contoured height profiles in said cross film direction ensuring compliance of said active heads with said magnetic layer tracks.

28. The camera of claim 27, wherein said outer heads have height profiles less than the height profiles of said active heads, whereby said multi-head array exhibits a composite convex profile conforming to a convex cross-curvature of the filmstrip in said film plane.

29. The camera of claim 28, wherein said height profiles are effected by providing said multi-head array as a plurality of active and dummy, frustum shaped heads exhibiting about the same profile positioned by said positioning means in operating relation to said cavity, and by lapping said plurality of frustum shaped heads with an abrasive tape exhibiting filmstrip cross-curvature advanced by said filmstrip advancing means to lap the frustum height profiles into a curvature conforming with said filmstrip cross-curvature.

30. The camera of claim 28, wherein said height profiles are effected by machining said plurality of active and dummy heads in a pattern conforming with said cross-curvature of said filmstrip.

31. A method of forming a magnetic record/reproduce head to conform in a high degree of compliance with a relatively inflexible photographic filmstrip having a substantially transparent magnetic layer on a surface of the filmstrip, the filmstrip having a cross-curvature in the cross film direction across the width of said filmstrip, comprising the steps of:

providing an array of magnetic record/reproduce heads as a plurality of frustum shaped heads exhibiting about the same height profile spaced apart on a support;

providing a filmstrip transport path for transporting a filmstrip in a film plane allowing a limited degree of cross-curvature of the filmstrip;

positioning said array in operating relation to the a film transport path and in interference with the film plane; and lapping said plurality of frustum shaped heads with an abrasive tape exhibiting said filmstrip cross-curvature advanced through said filmstrip transport path to lap the frustum height profiles into a curvature conforming with said filmstrip cross-curvature.

32. The method of claim 31, wherein said lapping step further comprises the steps of:

mating a filmstrip and abrasive tape in side-by-side relation; and advancing the mated abrasive tape and filmstrip through said transport path with said abrasive tape side in contact with said array.

* * * * *